May 20, 1924.
J. VOM HOFE
FISHING REEL
Filed Jan. 19, 1923
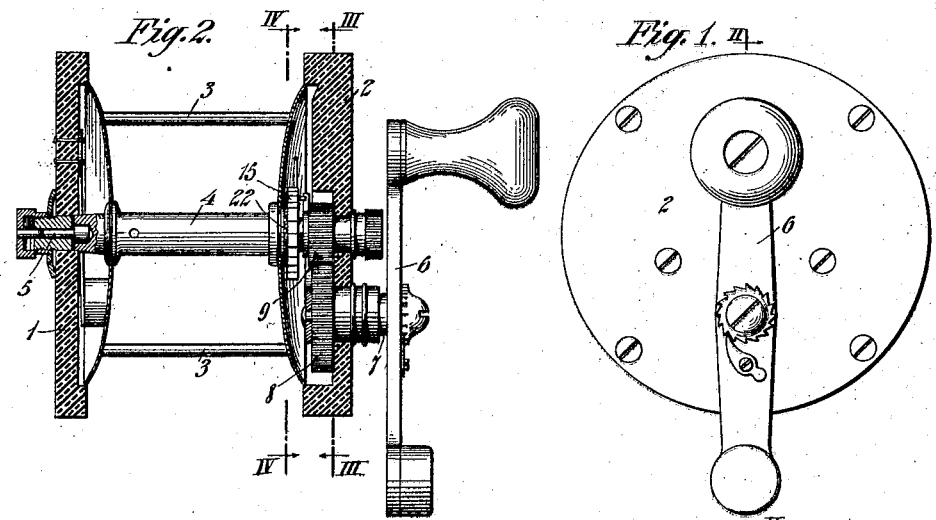
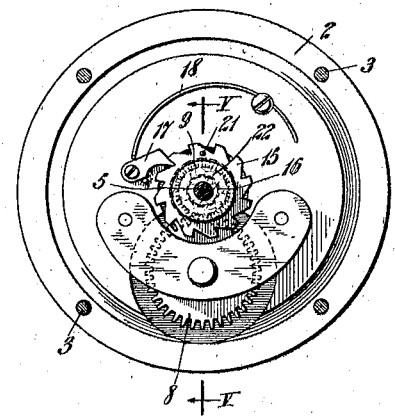
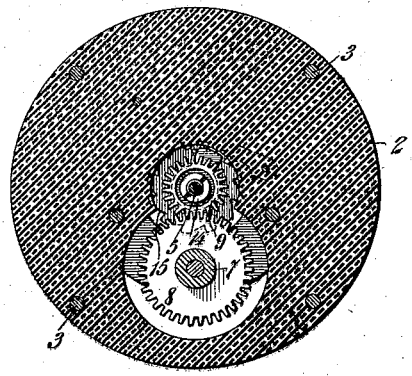
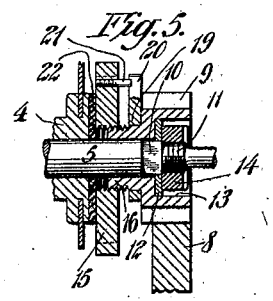
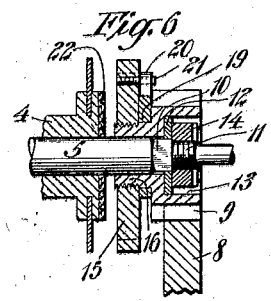
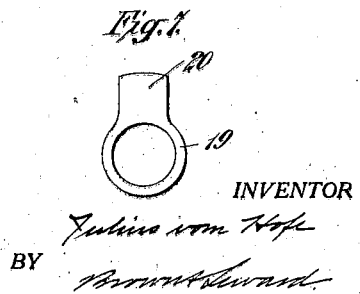
INVENTOR
Julius vom Hofe
BY
ATTORNEYS Patented May 20, 1924.

1,494,870

UNITED STATES PATENT OFFICE.

JULIUS vom HOFE, OF BROOKLYN, NEW YORK, ASSIGNOR TO THOMAS B. MILLS, OF NEW YORK, N. Y.

FISHING REEL.

Application filed January 19, 1923. Serial No. 613,634.

*To all whom it may concern:*

Be it known that I, JULIUS VOM HOFE, a citizen of the United States, and resident of the borough of Brooklyn, in the city and State of New York, have invented a new and useful Improvement in Fishing Reels, of which the following is a specification.

The object of my invention is to provide certain improvements in the construction, form and arrangement of the several parts of a fishing reel whereby its mechanism is materially simplified, its cost of production reduced and its manipulation and control facilitated.

My invention includes improvements in that type of fishing reel in which the manipulation of the handle provides a graduated friction drag on the spool and also includes a mechanism by which a predetermined pull on the line will instantly free the spool without manipulation of the handle.

My invention more particularly includes a device in which the pinion of the winding mechanism is rotatably mounted on the spool shaft and a braking member is screw-threaded on said pinion, means being provided for coaction with the braking member and pinion whereby the rotary movement of the pinion will move the braking member inwardly and outwardly into and out of frictional engagement with the spool; a lost motion connection being provided between the pinion and braking member to prevent the braking member from jamming at either limit of its movement.

A practical embodiment of my invention is represented in the accompanying drawings, in which—

Fig. 1 represents a side view of the fishing reel.

Fig. 2 represents a section taken in the plane of the line II—II of Fig. 1.

Fig. 3 represents a section taken in the plane of the line III—III of Fig. 2.

Fig. 4 represents a section taken in the plane of the line IV—IV of Fig. 2.

Fig. 5 represents an enlarged detail section taken in the plane of the line V—V of Fig. 4, with the parts in the positions they assume when the brake is applied.

Fig. 6 represents a similar view with the parts in the positions they assume when the brake is released.

Fig. 7 represents a detail face view of the disc carried by the winding mechanism pinion, which disc forms part of the lost motion connection between the pinion and braking member.

The end plates of the reel are denoted by 1 and 2, which end plates are suitably connected and spaced apart by the usual cross-bars 3. The spool 4 has its shaft 5 suitably mounted in the end plates of the reel.

The winding mechanism includes the handle 6, handle shaft 7, gear 8 and pinion 9. The pinion 9 is rotatably mounted on the spool shaft 5. In the present instance I have provided the following means for limiting the outward movement of the pinion along the spool shaft 5. The spool shaft 5 is provided with a squared portion 10 and a threaded portion 11. A washer 12 is fitted to the squared portion 10 of the shaft and is held against the bottom of the recess 13, in the pinion 9 by a nut 14 engaging the screw-threaded portion 11 of the spool shaft.

The graduated frictional brake for the spool comprises a braking member 15, screw-threaded onto the shank 16 of the pinion 9, which braking member in the present instance is shown as a ratchet wheel, the teeth of which are engaged by a pawl 17, carried by the end plate 2 of the reel. A suitable spring 18 serves to yieldingly hold the pawl 17 in engagement with the teeth of the ratchet wheel to prevent a reverse movement thereon.

A lost motion connection is provided between the pinion 9 and the ratchet 15, which connection is herein shown as comprising a disc 19, fixedly mounted on the shank 16 of the pinion, which disc is provided with a radial lug 20. A lateral pin 21 projects from the ratchet 15 into the path of the lug 20.

A friction disc 22, of fibre, leather or other suitable material, is located on the spool shaft 5 between the ratchet 15 and adjacent end of the spool 4.

In operation, when it is desired to apply the frictional braking effect to the spool, the handle 6 is turned in a clock-wise direction to rotate the pinion 9 of the winding mechanism in a counter clock-wise direction to unscrew the ratchet 15, it being understood that the ratchet is held against rotary movement in one direction by the pawl 17. This counter clock-wise rotary movement of the pinion 9 will move the ratchet 15 inwardly into frictional engagement with the brake disc 22, the pressure on the handle regulating the amount of the frictional engagement and retarding effect on the spool. The parts are so arranged that when the handle is released, a predetermined pull on the line will effect the immediate release of the brake through the action of the pawl 17 against the ratchet 15, tending to screw the ratchet 15 outwardly along the threaded shank 16 of the pinion 9, away from the brake disc 22. This release can also be accomplished by the turning of the handle in a counter clock-wise direction to unwind the reel. The turning of the handle in this counter clock-wise direction will cause the pinion 9 to be rotated in a direction to screw the ratchet 15 onto the shank 16 of the pinion 9, thus moving the ratchet out of its braking engagement with the brake disc 22.

The lost motion connection between the ratchet and the pinion will absolutely prevent any danger of the ratchet permanently jamming at either limit of its inward and outward movement, the said movement being absolutely controlled by said lost motion connection.

It will be seen from the above description that I have provided an effective regulable braking mechanism which is extremely simple, also providing for a free spool which is automatic in its action, the arrangement of the parts permitting the ratchet to act as the movable frictional braking member and also permitting the parts to be mounted within the side plate, thus obviating the necessity of using an additional housing to cover said mechanism.

It will be understood that the pitch of the screw-threaded connection between the ratchet and pinion will control the coarseness or fineness of the frictional adjustment.

It is also evident that various changes may be made in the construction, form and arrangement of the several parts without departing from the spirit and scope of my invention; hence, I do not wish to limit myself to the particular embodiment herein shown and described, but

What I claim is:—

1. In a fishing reel, a spool, a spool shaft, and spool winding mechanism including a pinion rotatably mounted on the shaft, means for limiting the outward movement of the pinion, a pawl carried by the reel and a ratchet screw-threaded on said pinion whereby the rotary movement of the pinion will move the ratchet inwardly and outwardly into and out of frictional braking engagement with the spool, said pinion and ratchet having a lost motion connection.

2. In a fishing reel, a spool, a spool shaft, and spool winding mechanism including a pinion rotatably mounted on the shaft, means for limiting the outward movement of the pinion, a pawl carried by the reel and a ratchet screw-threaded on said pinion whereby the rotary movement of the pinion will move the ratchet inwardly and outwardly into and out of frictional braking engagement with the spool, said pinion and ratchet having a lost motion connection, including abutments carried by the pinion and ratchet.

3. In a fishing reel, a spool, a spool shaft, and spool winding mechanism including a pinion rotatably mounted on the shaft, means for limiting the outward movement of the pinion, a pawl carried by the reel, a ratchet screw-threaded on said pinion whereby the rotary movement of the pinion will move the ratchet inwardly and outwardly into and out of frictional braking engagement with the spool, said pinion and ratchet having a lost motion connection, including a lug carried by the pinion, and a pin carried by the ratchet projecting into the path of the lug.

4. In a fishing reel, a spool, a spool shaft, and spool winding mechanism including a pinion rotatably mounted on the shaft, means for limiting the outward movement of the pinion, a pawl carried by the reel, a ratchet screw-threaded on said pinion whereby the rotary movement of the pinion will move the ratchet inwardly and outwardly into and out of frictional braking engagement with the spool, said pinion and ratchet having a lost motion connection, including a disc carried by the pinion, having a radial lug, and a lateral pin carried by the sprocket projecting into the path of the lug.

5. In a fishing reel, a spool, a spool shaft, a friction disc mounted on the spool shaft, and a spool winding mechanism including a pinion rotatably mounted on the shaft, means for limiting the outward movement of the pinion, a pawl carried by the reel, and a ratchet screw-threaded on said pinion whereby the rotary movement of the pinion will move the ratchet inwardly and outwardly into and out of frictional braking engagement with said disc and spool.

6. In a fishing reel, a spool, a spool shaft and spool winding mechanism including a pinion rotatably mounted on the shaft, means for limiting the outward movement of the pinion, a braking member screw-threaded on said pinion, and means coacting with the pinion whereby the rotary movement of the pinion will move the braking member inwardly and outwardly into and out of frictional engagement with the spool.

7. In a fishing reel, a spool, a spool shaft, and spool winding mechanism including a pinion rotatably mounted on said shaft, means engaging the shaft for limiting the outward movement of the pinion, a braking member screw-threaded on said pinion, and means coacting with the frictional braking member and pinion whereby the rotary movement of the pinion will move the frictional braking member inwardly and outwardly into and out of braking engagement with the spool.

In testimony, that I claim the foregoing as my invention, I have signed my name this 17th day of January, 1923.

JULIUS vom HOFE.